Figure 1:
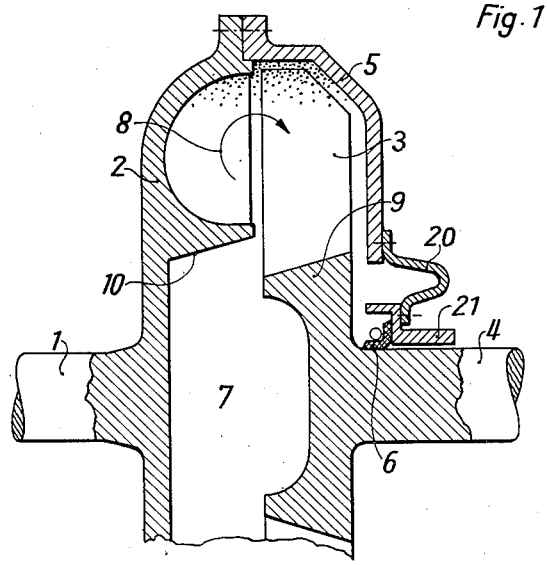

Oct. 30, 1956    H. MÜLLER    2,768,722
HYDRAULIC COUPLING AND FLUID WORKING MEDIUM
THEREFOR CONSISTING OF LIQUID
AND SOLID PARTICLES
Filed June 3, 1952

INVENTOR.
HELMUT MÜLLER
BY
Attorneys

United States Patent Office 2,768,722
Patented Oct. 30, 1956

2,768,722

HYDRAULIC COUPLING AND FLUID WORKING MEDIUM THEREFOR CONSISTING OF LIQUID AND SOLID PARTICLES

Helmut Müller, Heidenheim, Germany, assignor to J. M. Voith G. m. b. H., Heidenheim, Germany, a German corporation Application June 3, 1952, Serial No. 291,461

Claims priority, application Germany June 6, 1951

7 Claims. (Cl. 192—3.2)

This invention relates to power transmissions, particularly to a novel combination hydraulic-mechanical power transmission which combines the essential advantages of the hydraulic or fluid transmission with the essential advantages of a mechanical power transmission, but, at the same time, eliminates a number of disadvantages of both.

Fluid couplings or fluid clutches, sometimes referred to as Föttinger couplings, are well-known to have the property of conveying a torque or moment between the impeller and runner at one hundred percent slip, which is a multiple of the torque or moment conveyed therebetween at the two to three percent slip. The percentage loss of efficiency of this type of transmission, however, is substantially identical with the percentage of slip, and, therefore, it is required that the fluid clutch be dimensioned in such a manner that the normal torque desired for it to transmit can be transmitted therethrough at only about two to three percent slip.

This, of course, results in a large diameter for the fluid clutch and with no possibility to utilize the great amount of power that can be transmitted through the clutch at higher percentages of slip. A particularly unfavorable situation arises when relatively small torques are to be transmitted at low speed, because it is also well-known that the capacity of a fluid transmission of this nature varies as the fifth power of the diameter and the third power of the speed of revolution.

In fluid clutches it is also well-known that, in order to prevent extremely high torques from being developed at larger percentages of slip, arrangements must be provided, such as adjustable deceleration rings, or means for receiving at least a part of the fluid medium, so that when necessary, the input side of the clutch can operate at high speed, while the output side is coming up to speed. Such arrangements are generally satisfactory in accomplishing their purpose, but are nevertheless expensive and increase the complexity of the clutch structure and also its bulk and weight.

For mechanical clutch arrangements, such as friction clutches, the problem of size is not so important, because they can be constructed on a much smaller scale, but for this reason the dissipation of heat generated during the operation, particularly when the clutch is slipping, creates difficulties. In mechanical clutches of this nature, it is well-known that the amount of heat generated is directly proportional to the slippage, and, therefore, at high slippage values large amounts of heat are generated, and such conditions can be tolerated only for brief periods of time. This condition is particularly bad with friction clutches because all of the heat is generated in a relatively small area.

Having the foregoing in mind, the primary object of the present invention is the provision of a coupling embodying the advantageous features of both fluid and mechanical couplings or clutches but eliminating the disadvantages referred to above.

Another object is the provision of a fluid type coupling characterized by operating in the manner of a mechanical coupling after the output side of the coupling has come up to speed.

A still further object is the provision of a fluid type coupling in which a high percentage of slip can be set up between the primary and secondary sides but which does not require auxiliary means for preventing the developing of an extremely high torque under such conditions.

A still further object of this invention is the provision of a fluid type clutch characterized in being extremely small but capable of transmitting high torques and at widely varying rotational speeds.

Figure 2:
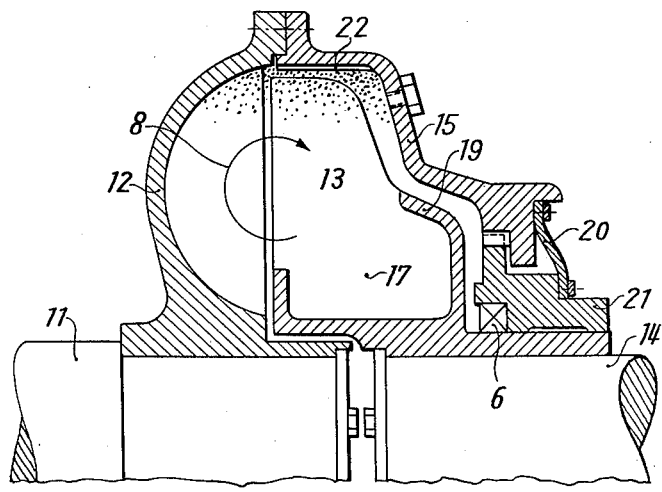

These and other objects and advantages will become more apparent upon reference to the following description taken in connection with the accompanying drawings, in which:

Figure 1 is a fragmentary sectional veiw showing one form which a clutch or coupling according to this invention can take; and Figure 2 is a veiw similar to Figure 1, but showing another form which the coupling can take according to this invention.

General arrangement

In carrying out the present invention, a novel medium is employed in the filling of the fluid circuit, and which consists of a mixture of liquid and solid particles having a greater specific weight than the liquid. The particles may, for example, be metal particles, such as small iron or steel balls or pellets, chips, or drillings, metal powder, or the like. The purpose of including the solid particles in the fluid is that under conditions of low slip a substantially solid drive is established from the impeller to the runner because the particles tend to be deposited in the outer periphery of the coupling, whereas, at high percentages of slip, the high rate of fluid circulation within the coupling dislodges the particles from about the periphery of the coupling, so that a normal fluid coupling exists between the impeller and runner.

It has been found that the point at which the particles are dislodged from their stationary position in the outer periphery of the coupling is attained relatively quickly when the slip of the coupling commences to increase. This comes about because with a linearly increasing slip condition, a quadratic rise of the rate of circulation of the liquid in the coupling obtains, and this very quickly dislodges the particles from their position about the outer periphery of the fluid coupling, in which position they have been held by centrifugal force under low slip conditions.

In the starting process, substantially the reverse conditions obtain, so that, while the coupling is coming up to speed, that is, while the runner is coming up to the speed of the impeller, substantially a purely fluid energizing circuit exists within the coupling, and then, when the relative motion between the impeller and runner decreases, the particles tend to deposit about the outer periphery of the coupling and establish a more or less slipless or positive drive between the impeller and runner.

According to the preferred form which this invention takes, means are provided whereby the solid particles that are picked up by the circulating oil in the coupling at high percentages of slip are centrifuged out of the actual working space within the coupling, thereby leaving substantially a purely fluid medium for transmitting energy from the impeller to the runner.

Structural arrangement

Referring to the drawings somewhat more in detail, in Figure 1 there is a primary or input shaft 1 which may be driven, for example, by a motor and rigidly mounted on shaft 1 is the impeller 2 comprising the usual blades by means of which the medium in the coupling is impelled.

Adjacent impeller 2 is the turbine wheel or runner 3, which is mounted on the driven or output shaft 4. A jacket 5 connected with impeller 2 encloses runner 3 and is sealed about shaft 4 by means of the packing at 6. It will be noted that the impeller and runner are independently supported and are not journaled together.

The blades of the runner are secured to the hub thereof and extend radially outwardly in cantilever fashion and also extend radially inwardly closer to the axis of rotation of the coupling than do the blades of the impeller 2. This enables the inner face of impeller 2 to be formed with a recess 7 into which the solid particles in the medium within the coupling are centrifuged under high slip conditions, and, when the said medium is moving rapidly within the coupling, as indicated by the arrow 8.

In normal operating conditions, that is, when the runner is operating at about the same speed as the impeller, the solid particles in the fluid are positioned about the outer periphery of the working space within the coupling, as indicated by the stippling in Figure 1.

The separation of the solid particles from the liquid portion of the medium in the coupling is enhanced by the special configuration imparted to the impeller and runner. This will be apparent on reference to Figure 1, wherein it will be seen that the hub 9 of the runner tapers inwardly toward the recess 7, whereas the port 10 of the impeller 2, and which forms the boundary wall surrounding recess 7, is likewise inclined inwardly, whereby the said particles are readily received into the recess 7, while also being readily centrifuged therefrom when the slip of the runner reduces and the circulation of the liquid within the coupling likewise slows down.

A still further advantage of the described arrangement is that the recess 7 tends to receive some of the working fluid from the working space within the coupling at high slip, and this reduces the power transmission capacity of the clutch, thus avoiding the transmission of an extremely high torque to the impeller which might stall the driving motor under conditions of heavy overload.

The independent supporting of the runner and impeller is taken advantage of in providing for a certain amount of flexibility in mounting the coupling so that a predetermined amount of misalignment of the driving and driven shafts is automatically compensated for by relative shifting movements between the runner and impeller. The sleeve 21 on shaft 4 and the flexible diaphragm 20 connecting the sleeve with the jacket 5 maintains an oil seal between the jacket and the shaft 4 under all normal conditions of misalignment.

In the Figure 2 arrangement, the impeller is identified at 12, and is mounted for being driven by an input shaft 11. The turbine wheel or runner is represented at 13 and is mounted on the driven or output shaft 14. Jacket 15 mounted on impeller 12 surrounds the runner 13 and is flexibly sealed about shaft 14 in the same manner as jacket 5 in Figure 1 is sealed about shaft 4.

The coupling in Figure 2 is particularly characterized by arranging within runner 13 the space 17 which is to receive the solid particles of the working medium within the coupling at high slip conditions. Space 17, therefore, corresponds to the space 7 described in connection with Figure 1. Space 17 is formed between the blades of the runner and is bounded in the back by the wall 19 and at the inside by the hub of the runner.

In normal operation, that is, when the slip of the coupling is low, the particles tend to distribute themselves about the outer periphery of the working space, thereby providing for a substantially positive drive between the impeller and the runner and the effectiveness of this drive may be still further enhanced by a plurality of axially extending grooves 22 about the outer periphery of the working space of the coupling on the inside of jacket 15.

One of the important results of constructing a coupling in the manner described above is that the bladed wheels 2 and 3 of Figure 1 and 12 and 13 of Figure 2, or at least one each of each pair, can be constructed with a relatively small number of blades. This comes about because fluid clutches which are otherwise identical, but which vary from each other according to the number of blades, differ only slightly at high slippage values, while their characteristics deviate widely at small slippage values. Since, according to the present invention, a substantially rigid coupling between the impeller and runner obtains for small slippage values, it is possible to construct one or both of the runner and impeller with a small number of blades without materially changing its operating characteristics over what would obtain if a greater number of blades were employed. It is, therefore, possible to construct the coupling more cheaply and of smaller weight.

A clutch or coupling according to the present invention is applicable for a great many purposes, such as the driving of machine tools, particularly large machine tools, and may also be employed to advantage in connection with motor trucks and other vehicles.

A particularly important feature of the present invention is that a clutch constructed in accordance therewith can be adapted to the most varied operating conditions. It eliminates the inherent slip that will obtain with an ordinary fluid coupling under the best operating conditions, and which always represents a loss of power. However, the clutch of the present invention retains at all times the advantage of a fluid coupling of ideal conditions for the dissipation of heat, so that, even at the very smallest slippage, there is an oil circuit within the coupling that transfers the heat to the large heat dissipating areas forming the outer wall of the coupling.

It will, of course, be understood that the percentage of solid particles combined with the liquid in the coupling to form the working medium and which combination of liquid and solid particles can be referred to as "fluid" can be varied widely in order to provide for precisely the degree of fluidity desired. Likewise, the particular size of the particles and the nature thereof as to their particular configuration and the material employed could be readily determined from the teachings of the present invention by simple experiments.

It will be understood that this invention is susceptible to modification in order to adapt it to different usages and conditions, and, accordingly, it is desired to comprehend such modifications within this invention as may fall within the scope of the appended claims.

I claim:

1. In a hydraulic, non-magnetic coupling of the nature described, having a driving and a driven shaft, an impeller on said driving shaft and a bladed runner on said driven shaft, said impeller and runner defining a working chamber therebetween, the combination of a fluid working medium comprising a liquid and solid particles of a specific weight greater than that of said liquid, and an auxiliary chamber provided substantially about the central axis of said coupling, said auxiliary chamber being freely communicating with said working chamber through a wide passage between the external side of the auxiliary chamber and the internal side of the working chamber, said auxiliary chamber being adapted to receive the major portion of said solid particles at high degree of slip between said impeller and said runner, thereby having a purely liquid medium in said working chamber, said particles being transferred to the periphery of said working chamber during a low degree of slip.

2. In a non-magnetic fluid coupling of the nature described, having a driving and a driven shaft, an impeller mounted on said driving shaft, and a bladed runner mounted on said driven shaft, inside said housing said impeller and runner defining a working chamber therebetween, the combination of a fluid working medium comprising a liquid and solid particles of a specific weight greater than said liquid, and recesses in said impeller and runner defining an auxiliary chamber about the central axis of the coupling substantially between said driving and said driven shaft, said auxiliary chamber being freely communicating with said working chamber through a wide passage between the external side of the auxiliary chamber and the internal side of the working chamber, said auxiliary chamber being adapted to receive the major portion of said solid particles at high degree of slip between said impeller and said runner, thereby having a purely liquid medium in said working chamber, said particles being transferred to the periphery of said working chamber during a low degree of slip.

3. In a non-magnetic fluid coupling of the nature described, having a driving and a driven shaft, an impeller mounted on said driving shaft, and a bladed runner mounted on said driven shaft, inside said housing said impeller and runner defining a working chamber therebetween, the combination of a fluid working medium comprising a liquid and solid particles of a specific weight greater than said liquid, and a recess in said runner defining an auxiliary chamber about the central axis of the coupling, said auxiliary chamber being freely communicating with said working chamber through a wide passage through the external side of the auxiliary chamber and the internal side of the working chamber, said auxiliary chamber being adapted to receive the major portion of said solid particles at high degree of slip between said impeller and said runner thereby leaving a purely liquid medium in said working chamber, said particles being transferred to the periphery of said working chamber during a low degree of slip.

4. In a non-magnetic fluid coupling of the nature described, having a driving and a driven shaft, an impeller mounted on said driving shaft, a housing rigidly connected to said impeller, flexible means for rotatably supporting said housing about said driven shaft, and a bladed runner mounted on said driven shaft, inside said housing said impeller and runner defining a working chamber therebetween, the combination of a fluid working medium comprising a liquid and solid particles of a specific weight greater than said liquid, and recesses in said impeller and runner defining an auxiliary chamber about the central axis of the coupling substantially between said driving and said driven shaft, said auxiliary chamber being freely communicating with said working chamber through a wide passage between the external side of the auxiliary chamber and the internal side of the working chamber, said auxiliary chamber being adapted to receive the major portion of said solid particles at high degree of slip between said impeller and said runner, thereby having a purely liquid medium in said working chamber, said particles being transferred to the periphery of said working chamber during a low degree of slip.

5. In a non-magnetic fluid coupling of the nature described, having a driving and a driven shaft, an impeller mounted on said driving shaft, a housing rigidly connected to said impeller, flexible means for rotatably supporting said housing about said driven shaft, and a bladed runner mounted on said driven shaft, inside said housing said impeller and runner defining a working chamber therebetween, the combination of a fluid working medium comprising a liquid and solid particles of a specific weight greater than said liquid, and a recess in said runner defining an auxiliary chamber about the central axis of the coupling, said auxiliary chamber being freely communicating with said working chamber through a wide passage through the external side of the auxiliary chamber and the internal side of the working chamber, said auxiliary chamber being adapted to receive the major portion of said solid particles at high degree of slip between said impeller and said runner thereby leaving a purely liquid medium in said working chamber, said particles being transferred to the periphery of said working chamber during a low degree of slip.

6. In a hydraulic non-magnetic coupling of the nature described, having a driving and a driven shaft, an impeller on said driving shaft and a bladed runner on said driven shaft, a housing rigidly connected to said impeller, flexible means for rotatably supporting said housing about said driven shaft, said housing being formed with axial grooves tending to inhibit circumferential slip of the particles when so deposited, said impeller and runner defining a working chamber therebetween the combination of a fluid working medium comprising a liquid and solid particles of a specific weight greater than that of said liquid, and an auxiliary chamber provided substantially about the central axis of said coupling said auxiliary chamber being freely communicating with said working chamber through a wide passage between the external side of the auxiliary chamber and the internal side of the working chamber, said auxiliary chamber being adapted to receive the major portion of said solid particles at high degree of slip between said impeller and said runner, thereby leaving a purely liquid medium in said working chamber, said particles being transferred to the periphery of said working chamber during a low degree of slip.

7. In a hydraulic coupling of the nature described, means forming a working space enclosing a bladed impeller and a bladed runner arranged side by side, a fluid working medium in said space comprising liquid containing solid particles of greater specific weight than the liquid but of such a size that they will only move with said liquid from the periphery to the center of said coupling when the liquid circulates in radial direction, in said coupling above a predetermined rate, and an auxiliary space in the coupling not forming a part of the working space proper and adapted for receiving at least a portion of said solid particles when the working medium circulates radically in the working space above said predetermined rate, said auxiliary space communicating with the periphery of the path of the working medium circulating in said working space to receive said solid particles by action of centrifugal forces acting toward all sides from the core of radial fluid circulation in the coupling toward and from its center, the means forming the working space consisting of the housing carried by the impeller and enclosing the runner, a shaft on the runner projecting through the housing, a sleeve surrounding said shaft and drivingly but flexibly connected to said housing, an oil sleeve between said sleeve and said shaft, and a flexible diaphragm sealingly connected with said sleeve and with said housing.

References Cited in the file of this patent

UNITED STATES PATENTS

| | | |
|---|---|---|
| 1,173,877 | Severy | Feb. 29, 1916 |
| 1,887,610 | Widegren et al. | Nov. 15, 1932 |
| 2,034,757 | Herreshoff | Mar. 24, 1936 |
| 2,130,895 | Ness | Sept. 20, 1938 |
| 2,135,246 | Yoxall | Nov. 1, 1938 |
| 2,466,356 | Beckes | Apr. 5, 1949 |
| 2,570,768 | Clerk | Oct. 9, 1951 |
| 2,622,713 | Rabinow | Dec. 23, 1952 |
| 2,629,471 | Rabinow | Feb. 24, 1953 |
| 2,643,748 | White | June 30, 1953 |

FOREIGN PATENTS

| | | |
|---|---|---|
| 836,718 | Germany | Apr. 15, 1952 |
| 920,562 | France | Jan. 4, 1947 |